No. 645,089. Patented Mar. 13, 1900.
W. R. HAMLEN.
APPARATUS FOR CONTROL OF ELECTRIC MOTORS.
(Application filed Sept. 12, 1899.)
(No Model.)
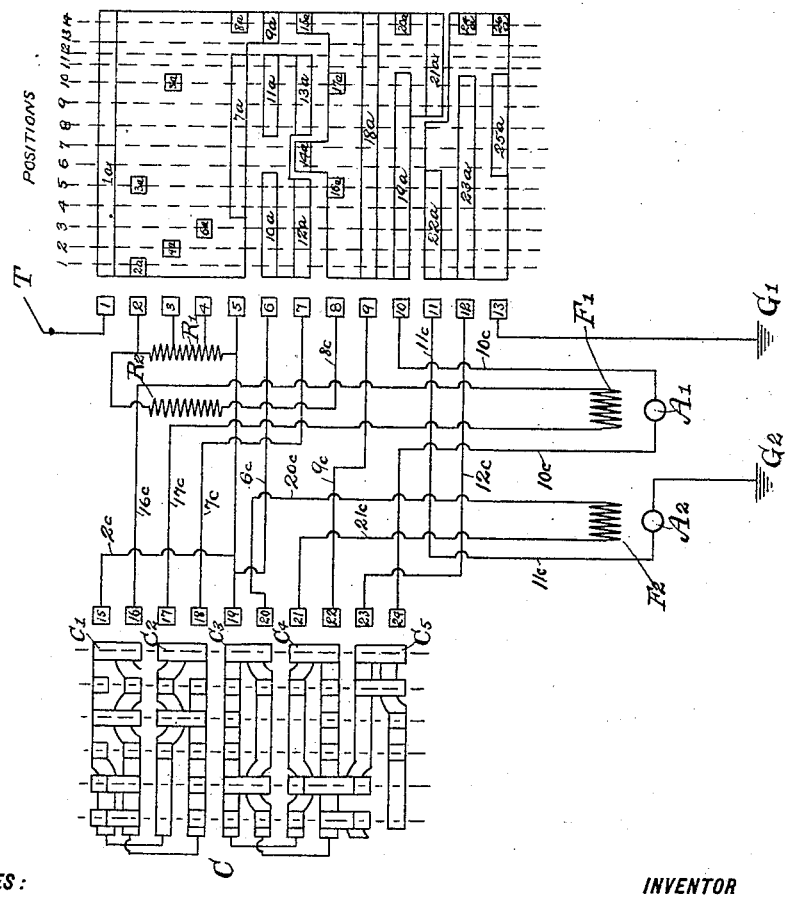
WITNESSES:
S. E. Clarkson
M. E. Sharpe.
INVENTOR
Wells R. Hamlen
BY
Geo. H. Parmelee
his ATTORNEY.

ively considered, consists in shifting the motors
UNITED STATES PATENT OFFICE.

WELLS R. HAMLEN, OF JOHNSTOWN, PENNSYLVANIA, ASSIGNOR TO THE LORAIN STEEL COMPANY, OF PENNSYLVANIA.

APPARATUS FOR CONTROL OF ELECTRIC MOTORS.

SPECIFICATION forming part of Letters Patent No. 645,089, dated March 13, 1900.

Original application filed April 19, 1899, Serial No. 713,691. Divided and this application filed September 12, 1899. Serial No. 730,207. (No model.)

*To all whom it may concern:*

Be it known that I, WELLS R. HAMLEN, of Johnstown, in the county of Cambria and State of Pennsylvania, have invented a new and useful Improvement in Apparatus for the Control of Electric Motors, of which the following is a full, clear, and exact description, reference being had to the accompanying drawings, which form a part of this specification.

My invention relates to the control of electric motors, and is designed to provide apparatus for effectively putting into practice the system of operating a plurality of electric motors, which is described and broadly claimed in my application, Serial No. 713,691, filed April 19, 1899, of which the present application is a division. That system, broadly considered, consists in shifting the motors from a series relation of their elements to a multiple relation by intermediate steps in which one element of each motor is connected in multiple with the corresponding element of the other motor or motors, the other elements being in series. The apparatus herein described and claimed is designed to effect these and other minor circuit changes in a practical and satisfactory manner by the operation of a single lever.

Broadly considered, the invention consists in the combination, with a plurality of electric motors, of a controlling-switch and electrical connections, the switch having contacts arranged relatively to said connections to first cut out one element of each motor and then connect one element of each in parallel with the corresponding element of the other or others, and other contacts to successively cut out one element of each motor, and to then connect the motors as a whole in parallel.

The invention also consists in the combination, with a plurality of electric motors and artificial resistance for connection in circuit therewith, of a switch having contacts and electrical connections whereby the motors in starting from a position of rest may be connected with their elements all in series relation with each other and with the artificial resistance, and by further movement of the operating-lever will gradually cut the resistance out of circuit while maintaining the series relation of the motor elements, and by still further movement will connect one element of each motor in multiple arc with the corresponding element of the other motor or motors, and will finally connect the motors as a whole in parallel.

The invention also consists in certain other novel features of construction and arrangement hereinafter described, and pointed out in the appended claims.

Referring to the accompanying drawings, Figure 1 is a diagram showing two electric motors, a controller, and such parts of the wiring and connections as serve to illustrate the nature and mode of operation of my invention. Fig. 2 shows, diagrammatically, the successive circuit connections or changes made by the operation of the controlling-switch.

Referring to Fig. 1, the letters $A'$ $A^2$ designate the armatures of the two electric motors, and $F'$ $F^2$ the respective field-coils of said motors. Squares 1 to 13, inclusive, designate a series of fixed contact-brushes, which form part of the controlling-switch, the balance of which consists of a plurality of moving contacts—such, for instance, as contact-pieces mounted on a cylinder or drum arranged to be rotated by an operating-lever. This type of controlling-switch is old in the art in so far as its general mechanical construction is concerned, and I have shown only the electrical contacts and their connections. These contacts are represented by the rectangles $1^a$ to $26^a$ and are divided into four different groups, each of which is electrically disconnected from the others, but whose individual contacts are each connected electrically to all the others of that group. Contacts $1^a$ to $9^a$, inclusive, comprise one group, contacts $10^a$ to $13^a$ a second group, contacts $14^a$ to $21^a$, inclusive, a third group, and contacts $22^a$ to $26^a$, inclusive, a fourth group. Certain of the contacts, as $9^a$, $14^a$, $15^a$, $21^a$, and $22^a$, while belonging electrically to the groups in which they are above classified in point of position with respect to brushes, are included on a portion of the controller drum or cylinder which belongs otherwise to an adjacent group, whereby certain of the brushes are designed to operate with contacts of two different groups in different positions of the controller. Brushes 6, 7, and 11 are shown as being of this class.

The numerals 15 to 24 designate a series of brushes which constitute the fixed contact members of a reversing-switch, which is also provided with groups of movable contacts C. This switch and its connections form no part of the present invention and are shown only for the purpose of enabling the circuits to be traced. For this purpose it will be sufficient to consider only the contacts $C'$ $C^2$ $C^3$ $C^4$ $C^5$, with which it will be assumed hereinafter that the brushes 15 to 24 are in engagement.

The brush No. 1 is connected to the high potential or trolley side of the circuit (indicated at T) through the usual portions of the car-wiring and instruments. (Not shown.) Brush No. 2 is connected to brush No. 15 through an external resistance $R'$ and connections $2^c$. Brushes 3 and 4 are also connected to brush 15 through portions of said resistance and connection $2^c$. Brush 5 is also connected to brush 15 by connection $2^c$, brush 6 to brush 19 by connection $6^c$, brush 7 to brush 18 by connection $7^c$, brush 8 to connection $2^c$ by connection $8^c$ and resistances $R^2$ $R'$, brush 9 to brush 22 by connection $9^c$, brush 10 to brush 24 through armature $A'$ and connections $10^c$, brush 11 to ground $G^2$ through armature $A^2$ and connections $11^c$, and brush 12 to brush 23 by connection $12^c$. Brushes 16 and 17 are connected to each other through field $F'$ and conductors $16^c$ and $17^c$ and brush 20 to brush 21 through field $F^2$ and conductors $20^c$ $21^c$. The dotted vertical lines 1 2, &c., indicate the several positions of the brushes 1 to 13 on the movable contacts in passing from a series to a multiple connection of the motors, and Fig. 2 shows, diagrammatically, the connection of the two motors and their elements at each position of the said brushes 1 to 13. At the first position of these brushes brushes 3, 4, 5, 8, and 13 are not engaging any of the movable contacts, but brushes 1, 2, 6, 7, 9, 10, 11, and 12 are respectively in engagement with contacts $1^a$, $2^a$, $10^a$, $12^a$, $18^a$, $19^a$, $22^a$, and $23^a$, and the course of the current, assuming brushes 15 to 24 to be engaging the contacts $C'$, $C^2$, $C^3$, $C^4$, and $C^5$, is as follows: from trolley T to brush 1, contacts $1^a$ $2^a$, brush 2, resistance $R'$, connection $2^c$, brush 15, contact $C'$, brush 16, connection $16^c$, field $F'$, connection $17^c$, brush 17, contact $C^2$, brush 18, connection $7^c$, brush 7, contacts $12^a$ $10^a$, brush 6, connection $6^c$, brush 19, contact $C^3$, brush 20, connection $20^c$, field $F^2$, connection $21^c$, brush 21, contact $C^4$, brush 22, connection $9^c$, brush 9, contacts $18^a$ $19^a$, brush 10, connection $10^c$, armature $A'$ to brush 24, contact $C^5$, brush 23, connection $12^c$, brush 12 to contacts $23^a$ $22^a$, brush 11, and connection $11^c$ through armature $A^2$ to ground $G^2$. In this position, therefore, the current passes through the artificial resistance $R$ and through the field-magnets and armatures of both motors in series. This is shown in position 1 of Fig. 2. At the next position the only change made in the contacts is that brush 2 passes off the contact $2^a$ and brush 3 becomes engaged with the contact $4^a$. The effect of this change, it will be seen, is to cut out of the motor-circuit a portion of the artificial resistance $R'$. No other changes are made in the circuit. At the third position brush 4 engages contact $6^a$ and brush 3 has left contacts $4^a$. The effect of this change is to cut out still more of the resistance $R'$ without disturbing otherwise the circuit. In the fourth position brush 4 has left contact $6^a$ and the brush 5 has engaged contact $7^a$. The current now passes directly from the contact $1^a$ to contact $7^a$, to brush 5, connection $2^c$, &c., as in the previous positions, resistance $R'$, however, being entirely cut out. Up to this point it will be noted that nothing but ordinary rheostatic regulation has been employed. In the fifth position brush 2 engages contact $3^a$ and brush 8 engages contact $16^a$; otherwise the points of contact are the same as in position 4. The effect of these changes is that the current divides, one part passing from brush 5 through connection $2^c$ and thence through both fields and armatures as before, and the other part passing through the resistance $R'$, connection $8^c$, brush 8, contacts $16^a$ and $19^a$ to brush 10, and thence through both armatures in series. In this position the resistance is no longer used rheostatically, but is used as a shunt to the field-winding, so that the fields may be weakened and the counter electromotive force correspondingly decreased, thereby allowing more current to pass to the armatures and accelerate them. The next three positions are "passover" or temporary positions, and it is not deemed necessary to trace out the connections in detail. In the first of these positions (position 6) the engagement of the brush 7 with the contact $14^a$ (while still bridging into the contact $12^a$) of the third group short-circuits the field $F^2$, and by contact of the brush 13 with contact $25^a$ the armature $A^2$ is also short-circuited. The next position (by reason of the passing of the brush 7 from contact $12^a$ wholly onto contact $14^a$) breaks the circuit through field $F^2$ and (by reason of the disengagement of brush 11 with contact $22^a$) cuts out the armature $A^2$. The eighth position by reason of the fact that the brush 7 again engages a contact of the second group (contact $13^a$) once more puts the two fields in series, armature $A^2$ remaining cut out. At the ninth position, which is an essential working position and perhaps the most important feature of the system, the two fields remain in series, but the two armatures are coupled up in parallel. The parallel coupling of the armatures results in a considerable acceleration of the speed; but this is sufficiently counteracted by the series coupling of the two fields and their consequent maximum resistance and abnormal strength to give no more than the desired amount of acceleration. Thus the first position in which the armatures are in parallel they are protected from receiving too great a rush of current not only because of the ohmic resistance of the two fields in series, but also by the counter electromotive force caused by the abnormally-strong fields. This change is effected by reason of the brush 11 being in engagement with the contact $21^a$ of the fourth group, while brushes 12 and 13 remain in engagement with the contacts $23^a$ and $25^a$. By reason of this change the current is divided, part going by brush 10 and connection $10^c$ to armature $A'$ and thence to ground and the other part going by brush 11 and connection $11^c$ through armature $A^2$ to ground. In position 10, which is also a working or "notch" position, brushes 3 and 8 have engaged, respectively, the contacts $5^a$ and $17^a$ of the first and third groups, respectively, thereby throwing part of the resistance $R'$ and resistance $R^2$ in shunt to the fields $F' F^2$, which remain in series with each other, armatures $A' A^2$ also remaining in parallel with each other. The effect of this change is to again reduce the strength of the fields by providing an additional path for the current. Positions 11, 12, and 13 are temporary or passover positions. In position 11 the brushes 3 and 8 have left the contacts $5^a$ and $17^a$, thereby cutting the resistances $R' R^2$ out of circuit. Brushes 12 and 13 have also left the contacts $23^a$ $25^a$, thereby breaking the ground connection of the armature $A'$. In position 12 the brush 10 has left the contact $19^a$, cutting out armature $A'$, the current passing from contact $21^a$ to brush 11 through the armature $A^2$ to ground. In position 13 brush 5 has passed from the contact $7^a$ of the first group and brush 6 has left contact $11^a$ of the second group and engages contact $9^a$ of the first group, thereby cutting out field $F'$, the other contacts remaining the same as in the last position. Position 14 is the last position and brings the two motors as a whole in parallel with the fields and armatures of each motor in series. This is effected as follows: Brushes 1, 5, 6, 7, 9, 10, 11, 12, and 13 are respectively engaged with contacts $L^a$, $8^a$, $9^a$, $15^a$, $18^a$, $20^a$, $21^a$, $24^a$, and $26^a$. The course of the current is now from trolley T to contact $L^a$ to contacts $8^a$ $9^a$. Here it divides, one part passing by the brush 5, connection $2^c$, brush 15, contact $C'$, brush 16, connection 16, field $F'$, connection $17^c$, brush 17, contact $C^2$, brush 18, connection $7^c$, brush 7, contact $15^a$, contact $20^a$, to brush 10, connection $10^c$, through armature $A'$, brush 24, contact $C^5$, brush 23, connection $12^c$, brush 12, contacts $24^a$ $26^a$, and brush 13 to ground. The other part passes from contact $9^a$ to brush 6, connection $6^c$ to brush 19, contact $C^3$, brush 20, connection $20^c$, field $F^2$, brush 21, contact $C^4$, brush 22, connection $9^c$, brush 9, contact $18^a$ to contact $21^a$, brush 11, connection $11^c$, and through armature $A^2$ to ground.

It will be observed, therefore, that by the operation of my switch I start with the two fields and the two armatures connected in series with each other and with artificial resistance; that I gradually cut the resistance out of circuit while retaining the series connections of the motor elements; that I next use the same resistance in shunt with the motor-fields still in series; that I next pass rapidly through a series of preparatory changes in which first one field and one armature are short-circuited, then cut out, and, thirdly, the fields are connected in series with one armature to a working position within the two fields are connected in series with the two armatures in parallel; that I next throw the resistance into parallel with the two fields in series and the two armatures in parallel. Then by successive preparatory changes in which first one armature and then one field are cut out I bring the motors as a whole to multiple relation. In this manner I am able with the waste of very little power in external resistance and by the movement of a single operating-lever to attain a gradual acceleration of the motors and without making at any time such an abrupt change as to injure the motors. It will also be observed that each of the four groups of contacts has a special function to perform. The contacts of the first group control the resistance $R'$ and the connections from the trolley to the reversing-switch and through the first field. The contacts of the second group control the second field. The contacts of the third group control the resistance $R^2$ and also the connection of armature $A'$, while the contacts of the fourth group control the connection of the armature $A'$ and also the ground connection. This arrangement of the contacts results in a simple contrivance, mechanically considered, and affords a means of carrying into application my improved method of control without unduly multiplying the circuit connections.

I do not wish to be limited to immaterial and non-essential details involved in the switch as above described, it being obvious that many minor changes may be made therein without departing from the spirit and scope of my invention as pointed out in the appended claims.

Having thus described my invention, what I claim, and desire to protect by Letters Patent, is—

1. The combination with a plurality of electric motors, and external resistance for connection in circuit therewith, of a controlling-switch having groups of contacts and electrical connections whereby the motor elements may be first connected all in series with each other and with the said resistance, and which, by further movement of the operating-lever will gradually remove the resistance from circuit while maintaining the series connection of the motor element, and subsequently thereto, connect one element of each motor in multiple arc with the corresponding element of the other motor or motors and then connect the two motors as a whole in multiple arc.

2. The combination with a plurality of electric motors, of a controlling-switch and connections for shifting said motors from series to parallel relation, said switch having contacts arranged relatively to said connections to first cut out one element of each motor and then connect one element of one in parallel with the corresponding element of the other or others, and other contacts to successively cut out one element of each motor, and then connect said motors as a whole in multiple.

3. The combination with two motors and artificial resistance for connection in circuit therewith, of a controller-switch adapted to shift said motors from series to parallel relation, said switch having a group of contacts arranged to connect said resistance in circuit with the motors in series therewith and also as a shunt to the motor-fields, other contacts arranged to connect one element of one motor in parallel with the corresponding element of the other motor and at the same time maintain the series connection of the other elements of the motors, and other contacts arranged to subsequently connect the said other elements in multiple.

4. The combination with a plurality of motors, and artificial resistance for connection therewith, of a controlling-switch adapted to change said motors from series to parallel relations, and having four groups of contacts which are electrically disconnected each group from the other, together with electrical connections, one of said groups being arranged to control the connection in circuit of the resistance, and of the first field, the second group arranged to control the connection of the second field, and the third group to control the connection of the first armature, and the fourth group to control the connection of the second armature.

5. The combination with two electric motors, of a controlling-switch therefor, comprising a series of brushes connections between said brushes and the working circuit, connections between pairs of said brushes and the fields of the two motors, and with one of the armatures, a connection between another of said brushes and the other armature, which is permanently grounded, and groups of contacts on said switch for engagement with said brushes, and arranged to connect the brushes in various ways to thereby connect the motor elements in series, or in multiple, or with an element of one motor in series with the corresponding element of the other motors, and the other elements in multiple.

In testimony whereof I have affixed my signature in presence of two witnesses.

WELLS R. HAMLEN.

Witnesses:
 L. A. WILSON,
 ETHEL M. DE CAMP.